United States Patent
Michishita et al.

(10) Patent No.: US 8,797,014 B2
(45) Date of Patent: Aug. 5, 2014

(54) DC-DC CONVERTER INCLUDING CIRCUIT TO DETECT SWITCHING FREQUENCY OF SWITCHING SUPPLY

(75) Inventors: Yuusuke Michishita, Osaka (JP); Shinya Shimizu, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 574 days.

(21) Appl. No.: 13/120,488

(22) PCT Filed: Sep. 14, 2009

(86) PCT No.: PCT/JP2009/066467
§ 371 (c)(1),
(2), (4) Date: Mar. 23, 2011

(87) PCT Pub. No.: WO2010/038636
PCT Pub. Date: Apr. 8, 2010

(65) Prior Publication Data
US 2011/0169464 A1    Jul. 14, 2011

(30) Foreign Application Priority Data
Sep. 30, 2008   (JP) ................................ 2008-254999

(51) Int. Cl.
*G05F 1/565*    (2006.01)
*G05F 1/575*    (2006.01)

(52) U.S. Cl.
USPC .......................................... 323/285; 323/271

(58) Field of Classification Search
USPC .................. 323/271, 282, 284–286
See application file for complete search history.

(56) References Cited

U.S. PATENT DOCUMENTS

| | | | |
|---|---|---|---|
| 5,912,552 A | 6/1999 | Tateishi | |
| 6,100,675 A | 8/2000 | Sudo | |
| 6,163,143 A | 12/2000 | Shimamori | |
| 6,404,251 B1 * | 6/2002 | Dwelley et al. | 327/172 |

(Continued)

FOREIGN PATENT DOCUMENTS

| CN | 1220515 A | 6/1999 |
|---|---|---|
| CN | 101212178 A | 7/2008 |

(Continued)

OTHER PUBLICATIONS

Jun. 13, 2012 Korean office action (including English translation thereof) of the Korean Patent Office in connection with a corresponding Korean patent application.

(Continued)

*Primary Examiner* — Adolf Berhane
*Assistant Examiner* — Fred E Finch, III
(74) *Attorney, Agent, or Firm* — Cooper & Dunham LLP

(57) ABSTRACT

A DC-DC converter to convert an input voltage into a predetermined voltage includes a first switching device to provide energy for an inductor; a second switching device to discharge the energy from the inductor to an output terminal; an error amplifier to amplify an error voltage between a first reference voltage and a monitoring voltage obtained by dividing an output voltage output from the output terminal; a set signal generation circuit including a first comparator into which a second reference voltage and an output of the error amplifier are input; a reset signal generation circuit; a control circuit into which an output from the set signal generation circuit and an output from the reset signal generation circuit are input; and a detection circuit to detect a switching frequency of an electric power supply, wherein a characteristic of the first comparator is changed according to the switching frequency.

6 Claims, 12 Drawing Sheets

(56) References Cited

U.S. PATENT DOCUMENTS

| | | |
|---|---|---|
| 7,212,748 B2 | 5/2007 | Koga |
| 7,646,187 B2 * | 1/2010 | Miyashita et al. ............ 323/284 |
| 2005/0258811 A1 | 11/2005 | Matsuo et al. |
| 2005/0269997 A1 * | 12/2005 | Usui et al. .................... 323/207 |
| 2006/0119401 A1 | 6/2006 | Kitagawa et al. |
| 2006/0181256 A1 | 8/2006 | Nagai |
| 2007/0090816 A1 * | 4/2007 | Yang ............................ 323/282 |
| 2008/0061755 A1 | 3/2008 | Michishita |
| 2008/0067992 A1 * | 3/2008 | Rasmus ....................... 323/281 |
| 2008/0079407 A1 * | 4/2008 | Shimada et al. ............. 323/283 |
| 2008/0150508 A1 | 6/2008 | Sohma |
| 2008/0197828 A1 | 8/2008 | Michishita |
| 2008/0224672 A1 * | 9/2008 | Trochut ....................... 323/268 |
| 2009/0174384 A1 | 7/2009 | Michishita et al. |
| 2009/0295346 A1 * | 12/2009 | Matthews .................... 323/267 |
| 2009/0302820 A1 | 12/2009 | Shimizu et al. |
| 2009/0322299 A1 | 12/2009 | Michishita et al. |
| 2010/0066328 A1 | 3/2010 | Shimizu et al. |

FOREIGN PATENT DOCUMENTS

| | | |
|---|---|---|
| JP | 5-46190 | 7/1993 |
| JP | 10-225105 | 8/1998 |
| JP | 11-155281 | 6/1999 |
| JP | 11-289754 | 10/1999 |
| JP | 2005-341789 | 12/2005 |
| JP | 2006-109013 | 4/2006 |
| JP | 2006-262686 | 9/2006 |
| JP | 2008-67495 | 3/2008 |
| JP | 2008-206214 | 9/2008 |
| JP | 2008-228514 | 9/2008 |
| JP | 2009-303303 | 12/2009 |
| JP | 2010-63276 | 3/2010 |
| JP | 2010-68671 | 3/2010 |
| JP | 2010-148312 | 7/2010 |
| WO | WO82/01288 | 4/1982 |

OTHER PUBLICATIONS

International Search Report and Written Opinion in PCT/JP2009/066467, Oct. 11, 2009.

Chinese official action dated Mar. 1, 2013 in corresponding Chinese patent application No. 2009 80 13 8591.6.

* cited by examiner

DC-DC CONVERTER INCLUDING CIRCUIT TO DETECT SWITCHING FREQUENCY OF SWITCHING SUPPLY

TECHNICAL FIELD

The present invention relates to DC-DC converters. More specifically, the present invention relates to a switching-regulator-type DC-DC converter using VFM mode control method.

BACKGROUND ART

In DC-DC converters, if an output current is low, VFM mode control method that can improve efficiency of the DC-DC converters by reducing a switching frequency of a switching device may be adopted. The VFM (i.e., Variable Frequency Modulation) mode control method is a method that outputs a constant voltage by determining an on-state time of a switching device of a DC-DC converter based on input and output voltages, by returning a monitoring output state and by adjusting a switching frequency based on the output state.

Moreover, if the output current is low, reducing a consumption current of a control circuit of the DC-DC converter is required in order to improve efficiency of a switching supply in parallel.

FIG. 1 is a circuit diagram of a DC-DC converter disclosed in Japanese Laid-Open Patent Application Publication No. 10-225105 (which is hereinafter called a first patent document). As shown in FIG. 1, the DC-DC converter 70 includes a synchronous rectifier circuit comprised of a switching transistor Q1 to provide an inductor L with an input voltage Vin selectively, a rectifier transistor Q2 and a schottky diode D2. The rectifier transistor Q2 is controlled by a reverse phase of the switching transistor Q1. More specifically, when the switching transistor Q1 is in an off-state (i.e., when RS flip flop FF1 is in a reset state), the rectifier transistor Q2 goes into an on-state and an inductor current IL flows through the rectifier transistor Q2. When the switching transistor Q1 is in an on-state, a current flowing through the inductor L gets to an output terminal Vout through a sense resistor Rs and is provided for a load. An output capacitor Cout stores electric power provided from the inductor L, and drives the load (i.e., provides a current for the load) when the inductor current IL for driving from the inductor L does not exist.

In a voltage regulator circuit shown in FIG. 1, two feedback paths are provided. In a first feedback path, a first feedback signal Vcnt1 that shows a target maximum inductor current to maintain an output voltage at a predetermined value is used. The first feedback signal Vcnt1 is generated by comparing a voltage VFB that is obtained by dividing the output voltage by a voltage divider comprised of dividing resistors R1 and R2, with a reference voltage Vref, by using a difference amplifier 58.

In a second feedback path, a second feedback voltage signal Vs, a voltage between both ends of the sense resistor Rs (i.e., the second feedback voltage signal Vs/the inductor current IL), is detected, and the second feedback voltage signal Vs is compared to the first feedback signal Vcnt1 by a comparator 56. The comparator 56 generates a reset signal to open the switching device Q1 (i.e., to turn off the switching device Q1) by resetting the RS flip flop FF1 when the second feedback voltage signal Vs is higher than the first feedback voltage signal Vcnt1. As a preferred embodiment, the RS flip flop FF1 gives priority to a reset input signal over a set input signal.

A comparator 60 compares the first feedback signal Vcnt1 to a light load reference voltage VLL and outputs a signal expressing a time constant determined by a load state. While the DC-DC converter is working, if the first feedback signal Vcnt1 becomes lower than the light load reference voltage VLL, the comparator 60 outputs a "L" level signal. An AND circuit AND1 waits in a state where an output from the comparator 60 and the set signal generated from a set pulse generator 62 both become "H" level (which means a high level voltage corresponding to "1" in a binary code) so as to provide a set terminal of the RS flip flop FF1 with a set pulse. Here if the first feedback signal Vcnt1 becomes lower than the light load reference voltage VLL, by which the output of the comparator 60 becomes "L" level, an output of the set pulse generator 62 cannot pass through the AND circuit AND1. As a result, a Q output of the RS flip flop FF1 comes to be set with a lower frequency than a normal state.

The above-mentioned DC-DC converter has a configuration that can keep the output voltage of the DC-DC converter constant by monitoring the output of an error amplifier and by being controlled by VFM mode control method if an output current is low.

However, the DC-DC converter described in the first patent document does not clearly specify a means to reduce a consumption current of a control circuit in the DC-DC converter, including a consumption current of the comparator monitoring the output of the error amplifier, and to improve efficiency of a switching supply.

In case of the VFM mode control method, it is possible to keep an output voltage constant because a switching frequency is controlled to be low if an output current is low, and is controlled so as to be higher as the output current increases.

When the output current increases and the switching frequency increases, some circuits that constitute a control circuit of a DC-DC converter need certain characteristics according to the switching frequency. In particular, in case of a first comparator into which outputs from a second reference voltage and an error amplifier are input, a component of the switching frequency is superimposed on the output voltage, and the component of the switching frequency is also superimposed on the output of the error amplifier into which a monitoring output obtained by dividing the output voltage is input. Therefore, the first comparator into which the output of the error amplifier is input needs the characteristic according to the switching frequency.

To meet the characteristic in a case where the switching frequency is high, it is possible to preliminarily set a consumption current to be high. However, when the output current is low and the switching frequency is low, the characteristic becomes excessive, which causes an increase of the consumption current of the DC-DC converter control circuit and a decrease of efficiency of a switching supply including the DC-DC converter control circuit.

On the other hand, even if the output current increases and the switching frequency becomes high, in a case where a proper characteristic according to the switching frequency is not provided for the first comparator, the output voltage of the switching supply becomes unstable, which possibly makes an output voltage ripple greater.

SUMMARY OF INVENTION

Embodiments of the present invention may solve or reduce one or more of the above-described problems.

More specifically, the embodiments of the present invention may reduce a consumption current of a control circuit in a DC-DC converter and improve efficiency of a switching supply.

According to one embodiment of the present invention, a DC-DC converter is provided to convert an input voltage input from an input terminal into a predetermined voltage and to output the predetermined voltage from an output terminal including:

a first switching device to provide energy for an inductor;

a second switching device or a rectifying device to discharge the energy from the inductor to the output terminal;

an error amplifier to amplify an error voltage between a first reference voltage and a monitoring voltage obtained by dividing an output voltage output from the output terminal;

a set signal generation circuit for the first switching device, including a first comparator into which a second reference voltage and an output of the error amplifier are input;

a reset signal generation circuit for the first switching device;

a control circuit for the first switching device and one of the second switching device and the rectifying device into which an output from the set signal generation circuit for the first switching device and an output from the reset signal generation circuit for the first switching device are input; and a detection circuit to detect a switching frequency of an electric power supply, wherein a characteristic of the first comparator is changed according to the switching frequency.

According to another embodiment of the present invention, a DC-DC converter to convert an input voltage input from an input terminal into a predetermined voltage and to output the predetermined voltage from an output terminal including:

a first switching device to provide energy for an inductor;

a second switching device or a rectifying device to discharge the energy from the inductor to the output terminal;

an error amplifier to amplify an error voltage between a first reference voltage and a monitoring voltage obtained by dividing an output voltage output from the output terminal;

a set signal generation circuit for the first switching device, including a first comparator into which a second reference voltage and an output of the error amplifier are input;

a reset signal generation circuit for the first switching device;

a control circuit for the first switching device and one of the second switching device and the rectifying device into which an output from the set signal generation circuit for the first switching device and an output from the reset signal generation circuit for the first switching device are input; and a detection circuit to detect an output current, wherein a characteristic of the first comparator is changed according to the output current.

According to another embodiment of the present invention, a DC-DC converter to convert an input voltage input from an input terminal into a predetermined voltage and to output the predetermined voltage from an output terminal including:

a first switching device to provide energy for an inductor;

a second switching device or a rectifying device to discharge the energy from the inductor to the output terminal;

an error amplifier to amplify an error voltage between a first reference voltage and a monitoring voltage obtained by dividing an output voltage output from the output terminal;

a set signal generation circuit for the first switching device, including two or more comparators with different characteristics into which a second reference voltage and an output of the error amplifier are input;

a reset signal generation circuit for the first switching device;

a control circuit for the first switching device and one of the second switching device and rectifying device into which an output from the set signal generation circuit for the first switching device and an output from the reset signal generation circuit for the first switching device are input; and a detection circuit to detect a switching frequency, wherein one of the comparators with different characteristics constituting the set signal generation circuit for the first switching device is selected according to the switching frequency.

According to another embodiment of the present invention, a DC-DC converter to convert an input voltage input from an input terminal into a predetermined voltage and to output the predetermined voltage from an output terminal including:

a first switching device to provide energy for an inductor;

a second switching device or a rectifying device to discharge the energy from the inductor to the output terminal;

an error amplifier to amplify an error voltage between a first reference voltage and a monitoring voltage obtained by dividing an output voltage output from the output terminal;

a set signal generation circuit for the first switching device, including two or more comparators with different characteristics into which a second reference voltage and an output of the error amplifier are input;

a reset signal generation circuit for the first switching device;

a control circuit for the first switching device and one of the second switching device and the rectifying device into which an output from the set signal generation circuit for the first switching device and an output from the reset signal generation circuit for the first switching device are input; and a detection circuit to detect an output current, wherein one of the comparators with different characteristics constituting the set signal generation circuit for the first switching device is selected according to the output current.

Other objects, features and advantages of the present invention will become more apparent from the following detailed description when read in conjunction with the accompanying drawings.

DESCRIPTION OF EMBODIMENTS

Figure 1:
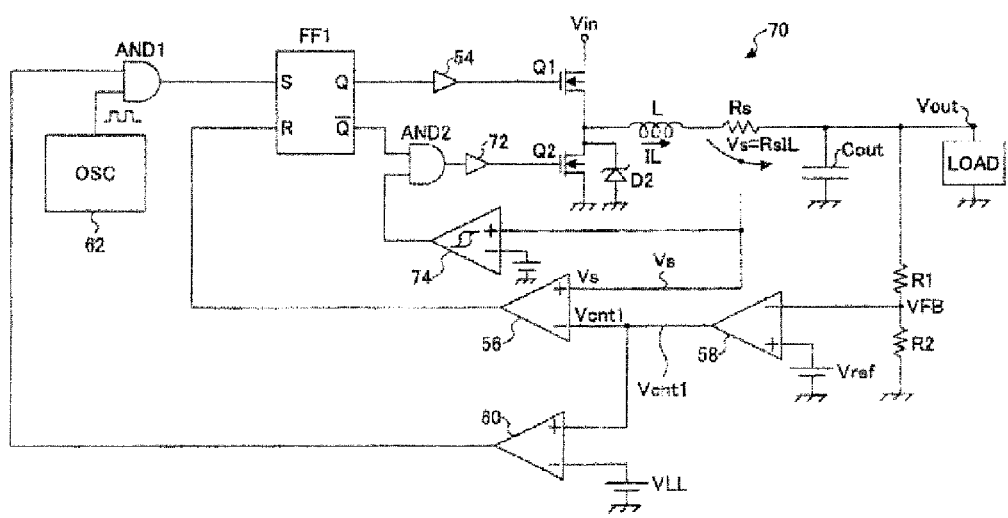
FIG. 1 is a configuration diagram of a conventional DC-DC converter.

A description is given, with reference to the accompanying drawings, of embodiments of the present invention. In the drawings, identical or corresponding elements are expressed with the same reference numerals, and explanations of the elements are not repeated to avoid overlap of the explanations.

First Embodiment

Figure 2:
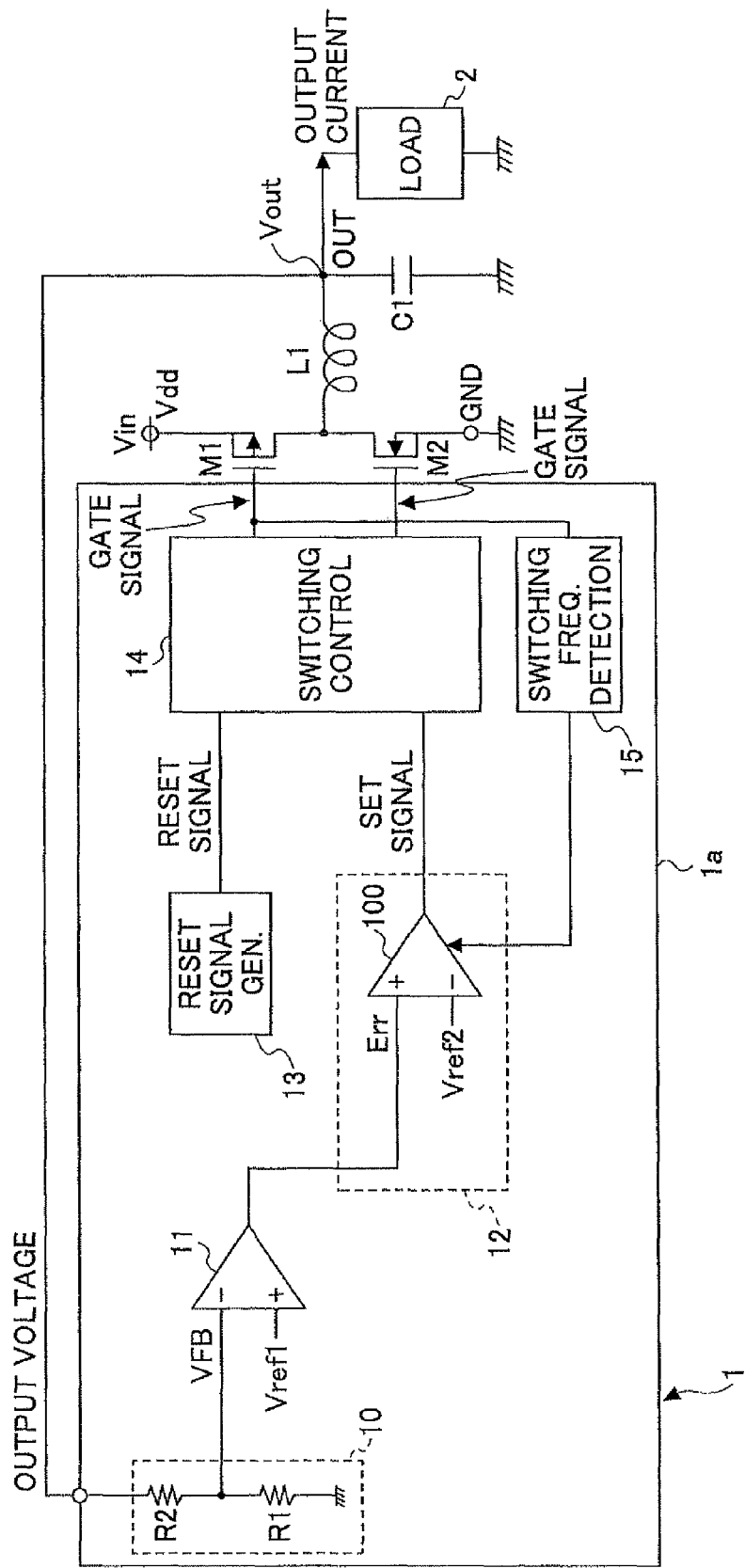
FIG. 2 is a configuration diagram of a DC-DC converter capable of changing a characteristic of a first comparator according to a switching frequency of a switching supply in a first embodiment of the present invention.

FIG. 2 shows a first embodiment of the present invention. More specifically, FIG. 2 is a circuit diagram showing a configuration of a DC-DC converter capable of changing a characteristic of a first comparator according to a switching frequency of a switching supply.

Figure 3:
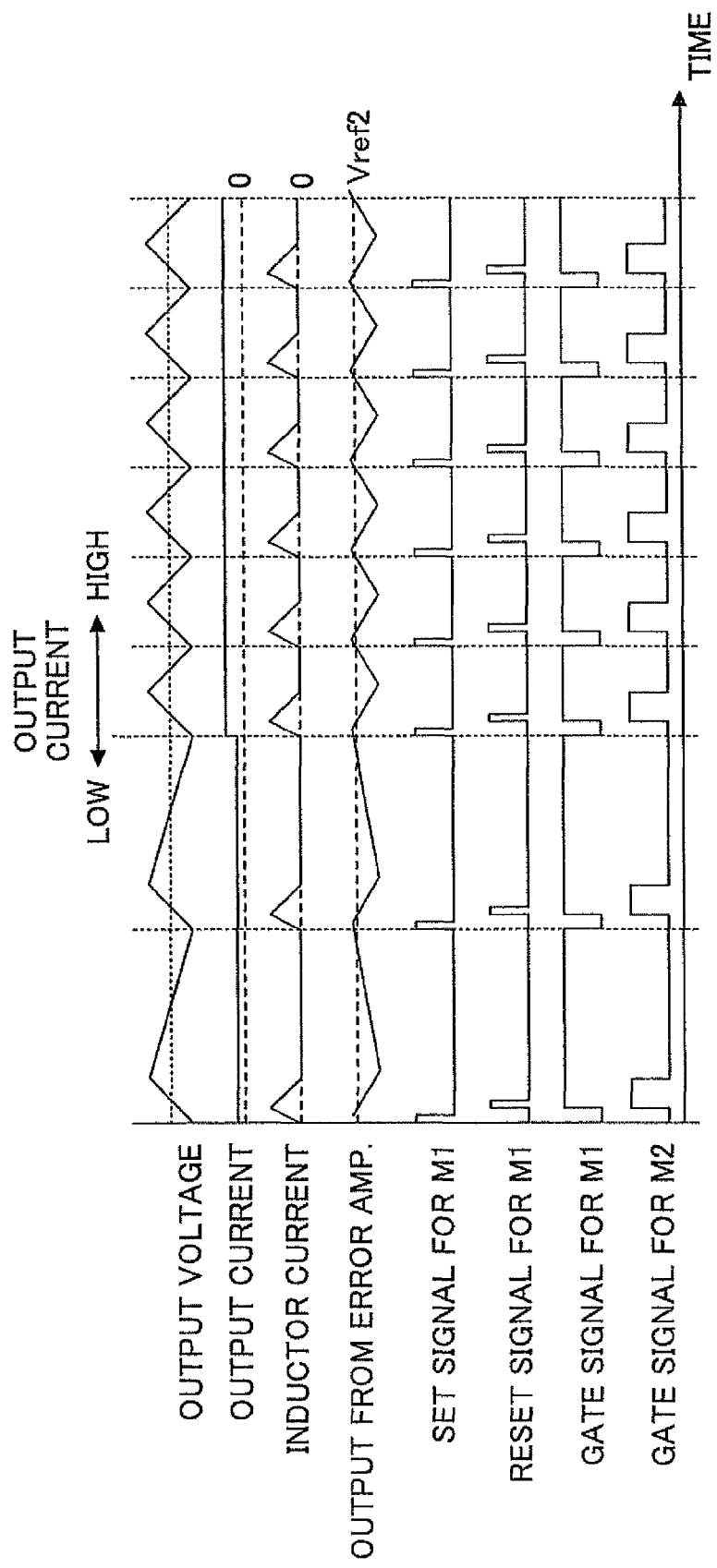
FIG. 3 is a waveform chart showing operation of the switching supply of the DC-DC converter in the first embodiment of the present invention.

FIG. 3 is a waveform chart showing operation of the switching supply, including the DC-DC converter in the first embodiment.

In FIG. 2, a DC-DC converter 1 generates a predetermined voltage from an input voltage Vin input into a Vdd terminal, an input terminal, from a direct-current power supply, and outputs the predetermined voltage as an output voltage Vout from an output terminal OUT toward a load 2.

The DC-DC converter 1 includes a first switching device M1 comprised of a PMOS (i.e., P-Channel Metal Oxide Semiconductor) transistor conducting switching operations to perform output control of the input voltage Vin, a switching device M2 for synchronous rectification comprised of an NMOS (i.e., N-Channel MOS) transistor, an inductor L1 and capacitance C1 constituting a smoothing circuit, and resistances R1, R2 constituting a dividing resistance 10 to divide the output voltage Vout and to generate and output a monitoring voltage VFB. The switching device M2 for synchronous rectification may be other rectifying device such as rectifying diode.

Furthermore, the DC-DC converter 1 includes an error amplifier 11. A reference voltage Vref1 is provided for a non-inverting input terminal of the error amplifier 11, and the monitoring voltage VFB is provided for an inverting input terminal of the error amplifier 11. The reference voltage Vref1 is generated by a reference voltage generation circuit not shown in FIG. 2, according to an input voltage set signal. The error amplifier 11 draws a voltage comparison between the monitoring voltage VFB and the reference voltage Vref1, and outputs an output signal Err of a voltage based on the comparison result.

An output from the error amplifier 11 is provided for a non-inverting input terminal of a first comparator 100 of a set signal generation circuit 12 for a first switching device to generate a set signal for a first switching device M1. A second reference voltage, a predetermined voltage higher than the first reference voltage, is provided for a non-inverting input terminal of the first comparator 100. The first comparator 100 compares the output signal Err from the error amplifier 11 to the second reference voltage, generates the set signal for the first switching device M1 based on the comparison result and provides a switching control circuit 14 with the set signal.

The switching control circuit 14 is given an output from a reset signal generation circuit 13 that generates a reset signal for the first switching device M1. The signals from the switching control circuit 14 are provided for the first switching device M1 and a switching device M2 for synchronous rectification, and the switching device M1 and the rectifier transistor M2 are controlled by reverse phase to each other. More specifically, when the switching device M1 is in an off-state, the rectifier transistor M2 goes into an on-state and an inductor current IL flows through the rectifier transistor M2. When the switching transistor M1 is in an on-state, a current flowing through the inductor L is carried to the output terminal OUT and provided for the load 2. An output capacitor C1 stores electric power provided from the inductor L1, and drives the load 2 (i.e., provide a current for the load 2) when the drive current IL from the inductor L1 does not exist.

A characteristic of the first comparator 100 is, as described below, changed according to the switching frequency of the switching supply. To constitute the DC-DC converter 1 so that the characteristic according to the switching frequency is provided for the first comparator 100, in embodiments of the present invention, a detection circuit 15 that detects a switching frequency is provided. In this embodiment, a gate signal for the first switching device M1 is input into the detection circuit 15 to detect the switching frequency of the switching supply. Since a frequency of the first switching device M1 varying from "Lo" to "Hi", or "Hi" to "Lo" is equivalent to the switching frequency of the power supply, the detection circuit 15 detects the switching frequency of switching supply by detecting a change of the gate signal for the switching device M1 from "Lo" to "Hi", or "Hi" to "Lo".

It is preferable to constitute the DC-DC converter 1 so that the characteristic of the first comparator 100 such as a consumption current is changed according to the switching frequency detected by the detection circuit 15 for detecting the switching frequency.

The switching device control circuit 14 is given a reset signal for the first switching device M1 generated by a reset signal generation circuit 13. An on-state time of the switching device M1, more specifically, a time since the set signal turns from "Lo" to "Hi" until the reset signal turns from "Lo" to "Hi", is uniquely determined if the input voltage Vin and the output voltage Vout are determined, in a case where the output voltage Vout is in a static state.

When the reset signal generated by the reset signal generation circuit 13 for the first switching device M1 turns from "Lo" to "Hi", the first switching device M1 is reset (i.e., turned off).

Moreover, in DC-DC converter 1, every part except the inductor L1, capacitor C1 and load 2 can be integrated in an IC. The Vdd terminal constitutes an input terminal of the DC-DC converter 1, and a GND terminal is connected to the earth ground voltage.

In this embodiment, the dividing resistance 10, the error amplifier 11, the set signal generation circuit 12 for the first switching device M1, the first comparator 100, the switching control circuit 14, the reset signal generation circuit 13 and the switching frequency detection circuit 15 constitute a DC-DC converter control circuit 1a.

Next, with reference to the waveform chart shown in FIG. 3, an operation of the switching supply in the first embodiment is explained.

An output voltage Vout is determined by the first reference voltage Vref1 and a resistance ratio R2/R1 of the dividing resistance 10 for the output voltage Vout. For example, if the first reference voltage Vref1 is 1 V and R2/R1 is 1, the output voltage Vout of the switching supply becomes 2 V.

Because an output of the error amplifier 11 is an inverting amplification of the output voltage Vout, as the output voltage Vout decreases, the output of the error amplifier 11 increases. Here, if the output of the error amplifier 11 reaches the second reference voltage Vref2, the set signal for the first switching device M1, the output from the first comparator 100, turns from "Lo" to "Hi". At a timing of turning from "Lo" to "Hi", the first switching device M1 is set, turned on. In the first embodiment, since the first switching device M1 is a P-channel transistor, the first switching device M1 is turned on when the gate signal is "Lo". The switching device control circuit 14 makes the gate signal "Lo" at a timing when the set signal for the first switching device M1 turns from "Lo" to "Hi", and provides the gate of the first switching device M1 with the gate signal. While the first switching device M1 is turned on, the current flowing through the inductor L1 increases and the inductor L1 stores energy.

The on-state time of the first switching device M1, the time since the set signal turns from "Lo" to "Hi" until the reset signal turns from "Lo" to "Hi", is uniquely determined if the input voltage Vin and the output voltage Vout is determined, in a case where the output voltage Vout is in a static state. When the reset signal generated by the reset signal generation circuit 13 for the first switching device M1 turns from "Lo" to "Hi", the first switching device M1 is reset (i.e., turned off). The switching device control circuit 14 makes the gate signal "Hi" at a timing when the reset signal turns from "Lo" to "Hi", and provides the reset signal for the gate of the first switching device M1.

If the first switching device M1 is turned off, the second switching device M2 is turned on, which causes the energy stored in the inductor L1 to discharge toward the output terminal OUT. In the first embodiment, because the second switching device M2 is an N-channel transistor, the second switching device M2 is turned on when the gate signal is "Hi". The switching device control circuit 14 makes the gate signal "Hi" at a timing when the reset signal turns from "Lo" to "Hi", and provides the reset signal for the gate of the second switching device M2. If the current flowing into the inductor L1 becomes zero, the second switching device M2 is turned off.

Because the input voltage Vin and output voltage Vout uniquely determine the on-state time of the first switching device M1, as shown in FIG. 3, as the output current increases, the switching frequency increases, which keeps the output voltage Vout constant.

As shown in FIG. 2, the switching frequency detection circuit 15 makes the gate signal for the first switching device M1 the input to detect the switching frequency of the switching supply. The frequency of the gate signal for the first switching device M1 varying from "Lo" to "Hi", or from "Hi" to "Lo" is equivalent to the switching frequency of the switching supply. The switching frequency detection circuit 15 controls a change of the consumption current of the first comparator 100, a change of the consumption current of the set signal generation circuit 12 for the first switching device M1, according to the switching frequency of the switching supply detected from the gate signal for the first switching device M1.

Figure 4:
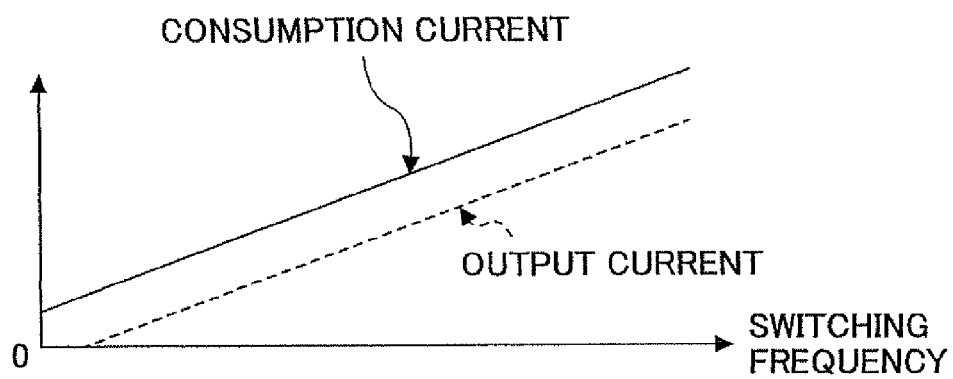
FIG. 4 is a diagram showing a linear relation of a consumption current of the first comparator to the switching frequency in the first embodiment of the present invention.
Figure 5:
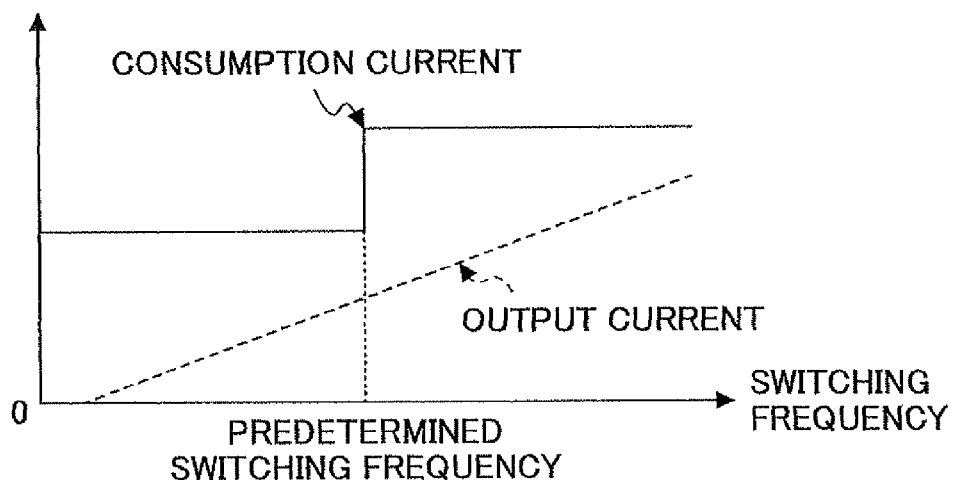
FIG. 5 is a diagram showing a relationship between a consumption current of the first comparator and the switching frequency in the first embodiment of the present invention.

Depending on the case, there are various possible methods of changing the consumption current of the first comparator 100 in response to the switching frequency. FIG. 4 and FIG. 5 show examples of the cases. FIG. 4 is a diagram showing a linear relation of the consumption current of the first comparator 100 to the switching frequency. FIG. 5 is a diagram showing a relationship between the consumption current of the first comparator 100 and the switching frequency in the first embodiment of the present invention.

In an example shown in FIG. 4, the consumption current of the first comparator 100 linearly increases and decreases according to the increase and decrease of the switching frequency. In an example shown in FIG. 5, a consumption current is set so that the consumption current of the first comparator 100 is kept constant at a low value until a predetermined switching frequency, and the consumption current is kept constant at a high value after the switching frequency passes the predetermined value.

In this embodiment, if the switching frequency is low, the consumption current of the first comparator 100 is low. Due to this, the consumption current of the DC-DC converter control circuit 1a becomes less, which can improve the efficiency of the DC-DC converter including the DC-DC converter control circuit 1a.

In addition, if the switching frequency is high, the consumption current of the first comparator 100 is high. At this time, because the characteristic based on the switching frequency is provided for the first comparator 100, it is possible to stabilize the output voltage Vout of the switching supply.

Second Embodiment

Figure 6:
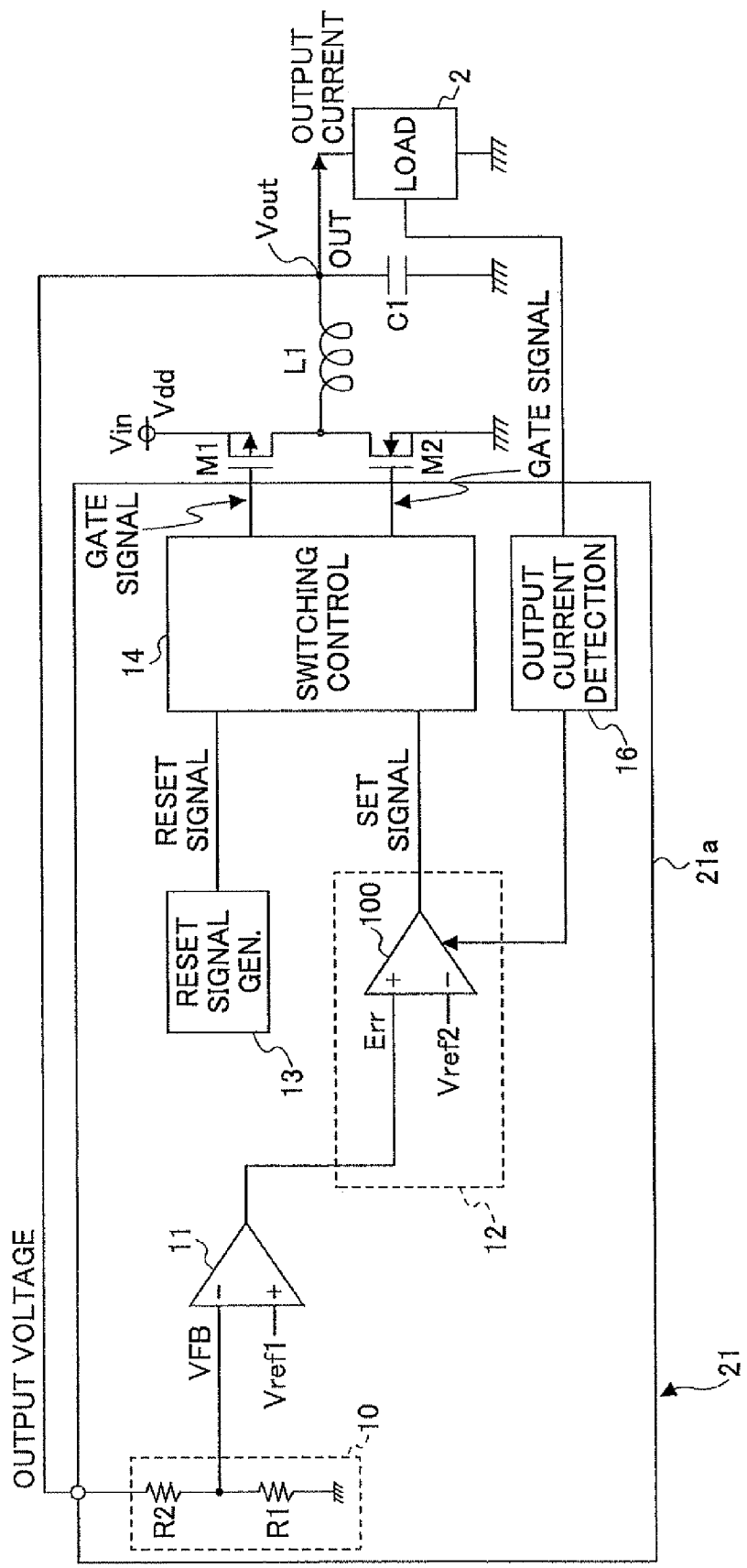
FIG. 6 is a configuration diagram of a DC-DC converter capable of changing a characteristic of a first comparator according to an output current of a switching supply in a second embodiment of the present invention.

FIG. 6 shows a second embodiment of the present invention, and is a circuit diagram showing a configuration of a DC-DC converter 21 capable of changing a characteristic of a first comparator according to an output current of a switching supply. The second embodiment includes an output current detection circuit 16 instead of the switching frequency detection circuit 15 of the first embodiment shown in FIG. 2. In a case of VFM mode control method, a switching frequency increases as an output current increases. Therefore, the DC-DC converter 21 in the second embodiment is configured including a detection circuit 16 to detect the output current, whereby the switching frequency is detected. Since operation of the switching supply and the other configurations are similar to the first embodiment, the same or corresponding parts are expressed with the same numerals in drawings and explanations of the parts are not repeated to avoid overlap of the explanations.

In case of the VFM mode control method, because an on-state time of a switching device is uniquely determined by an input voltage and an output voltage, as shown in FIG. 4, the switching frequency and the output current have a linear relationship. With the relationship, by detecting the output current of the switching supply, indirectly detecting the switching frequency is possible. Because of this, in the second embodiment, the output current detection circuit 16 detects the output current provided for a load 2. The output current detection circuit 16 detects the switching frequency of the switching supply by detecting the output current, and controls a consumption current of a first comparator 100, that is, a consumption current of a set signal generation circuit for a first switching device M1.

Figure 7:
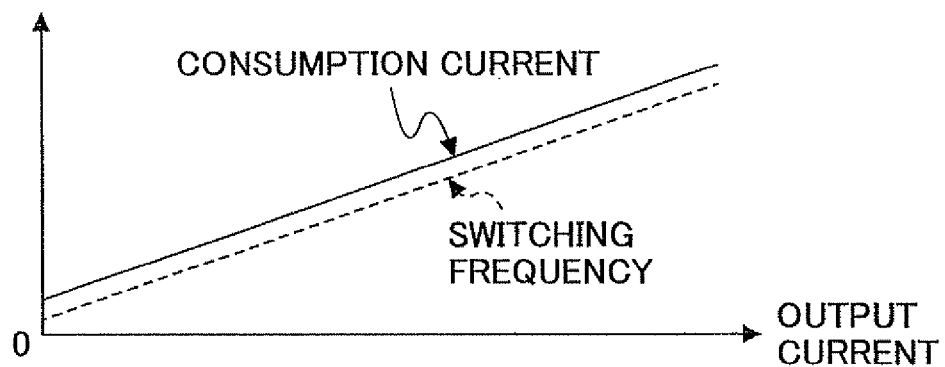
FIG. 7 is a diagram showing a linear relation of a consumption current of a first comparator to an output current in a second embodiment of the present invention.
Figure 8:
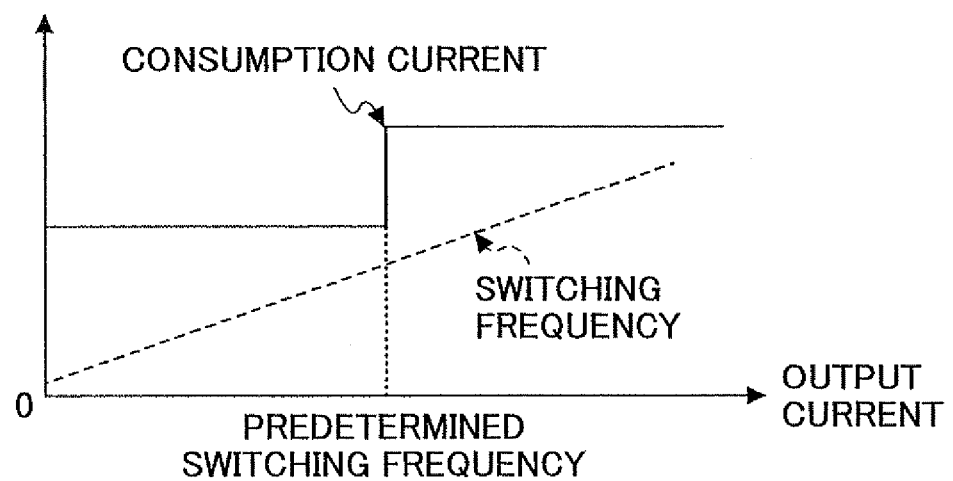
FIG. 8 is a diagram showing a relationship between a consumption current of the first comparator and the output current in the second embodiment of the present invention.

Depending on the case, there are various possible methods of changing the consumption current of the first comparator 100 in response to the output current possibly varies depending on cases. FIG. 7 and FIG. 8 show examples of the cases. FIG. 7 is a diagram showing a linear relation of a consumption current of the first comparator 100 to an output current. FIG. 8 is a diagram showing a relationship between a consumption current of the first comparator 100 and the output current.

FIG. 7 is a diagram showing a linear relation of the consumption current of the first comparator 100 to the output current. In an example shown in FIG. 7, according to increase and decrease of the output current, the consumption current of the comparator 100 linearly increases and decreases. In an example shown in FIG. 8, the consumption current of the first comparator 100 is set to be kept constant at a low value until an output current corresponding to a predetermined switching frequency is reached, and at a high value after passing the predetermined output current value corresponding to the predetermined frequency.

In this embodiment, if the output current is low, the consumption current of the first comparator 100 is low. This makes a consumption current of a DC-DC converter control circuit 21a low, and makes it possible to improve the efficiency of the DC-DC converter 21 including DC-DC converter control circuit 21a.

In addition, if the output current is high, the consumption current of the first comparator 100 is high. At this time, because a characteristic in accordance with the switching frequency is provided for the first comparator 100, stabilizing the output voltage Vout of the switching supply is possible.

Third Embodiment

Figure 9:
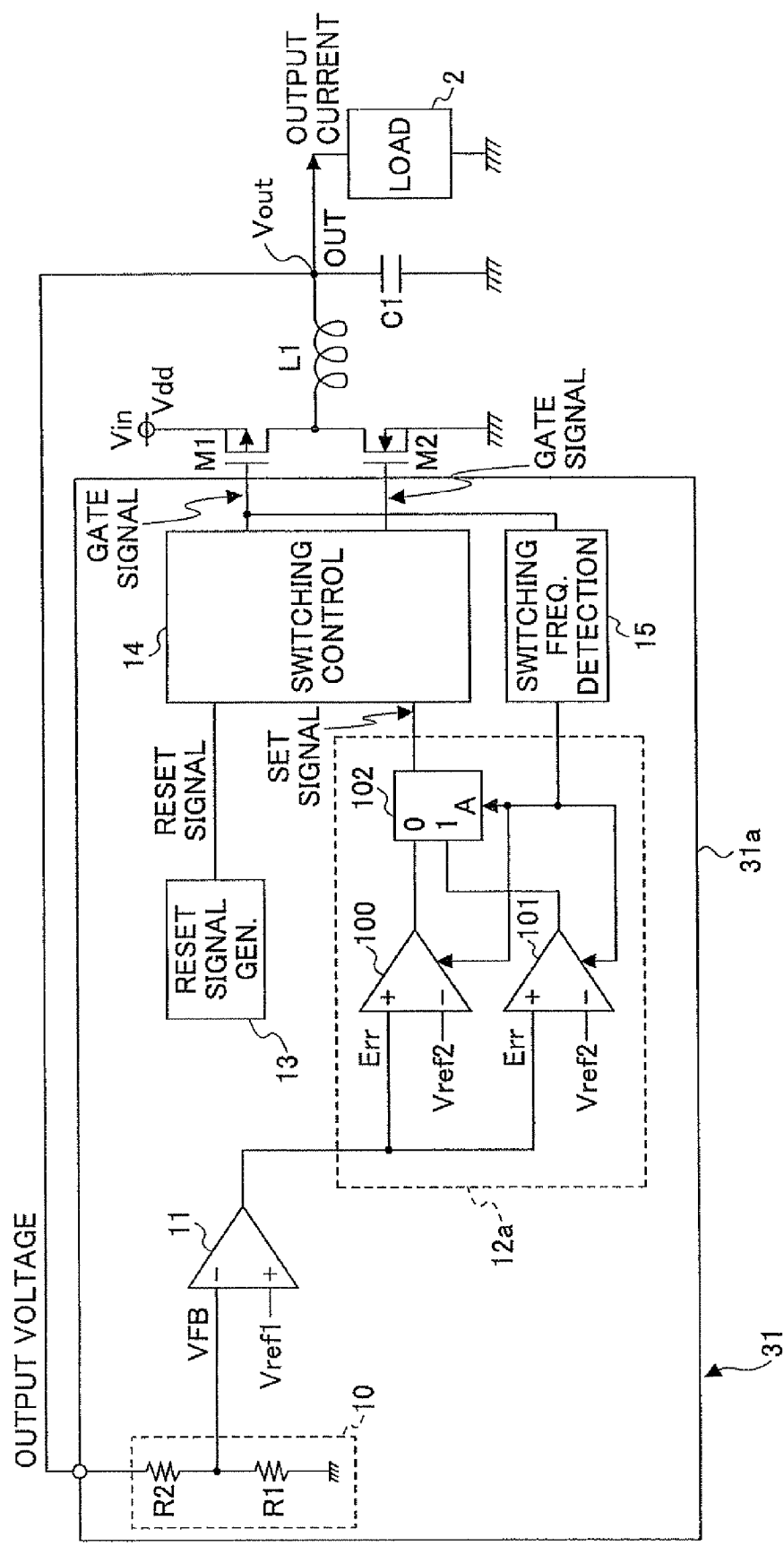
FIG. 9 is a configuration diagram of a DC-DC converter capable of selecting a comparator among two or more comparators constituting a set signal circuit for a first switching device according to a switching frequency of a switching supply in a third embodiment of the present invention.

FIG. 9 shows a third embodiment of the present invention. More specifically, FIG. 9 is a circuit diagram showing a configuration of a DC-DC converter 31 capable of selecting a comparator among two or more comparators 100, 101 constituting a set signal generation circuit 12a for a first switching device M1, according to a switching frequency. The set signal generation circuit 12 for the first switching device M1 of the first embodiment shown in FIG. 2 includes only one comparator 100, and a characteristic of the comparator 100 is changeable. By contrast, the third embodiment configures a set signal generation circuit 12a so that the set signal generation circuit 12 includes two or more comparators with different characteristics and selects a comparator among the two or more comparators 100, 101. Since an operation of a switching supply and the other configurations are similar to the first embodiment, the same or corresponding parts in drawings are expressed with the same reference numerals and explanations of the parts are not repeated to avoid overlap of the explanations.

As shown in FIG. 9, in the third embodiment, the set signal generation circuit 12a for the first switching device M1 includes two comparators 100, 101 with different characteristics. An output Err from an error amplifier 11 is each provided for non-inversing input terminals of each comparator 100, 101. Second reference voltages Vref2 are provided for inversing input terminals of comparators 100, 101. The comparators 100, 101 compare output signals Err from the error amplifier 11 to the second reference voltages Vref2, and results of the comparisons are provided for a selection circuit 102. A switching frequency detection circuit 15 provides a detection output for the comparators 100, 101 and the selection circuit 102. The comparators 100, 101 performs active or sleeping operations according to the detection output. Also, the selection circuit 102 selects either output of the comparator 100 or the comparator 101 according to the detection output from the switching frequency detection circuit 15.

In the third embodiment, either of the two comparators 100, 101 is selected based on the switching frequency of the switching supply. When the switching frequency from the switching frequency detection circuit 15 is low, the comparator 100 becomes active, and the comparator 101 enters sleep mode. When the switching frequency from the switching frequency detection circuit 15 is high, the comparator 100 enters the sleep mode, and the comparator 101 becomes active. Then, receiving the signal generated by the switching frequency detection circuit 15, the selection circuit 102 makes an output of the active comparator 100, 101 effective. In the third embodiment, the comparator 100 and the comparator 101, of which bias currents are different from each other, are used and the bias current of the comparator 100 is lower than that of the comparator 101.

Figure 10:
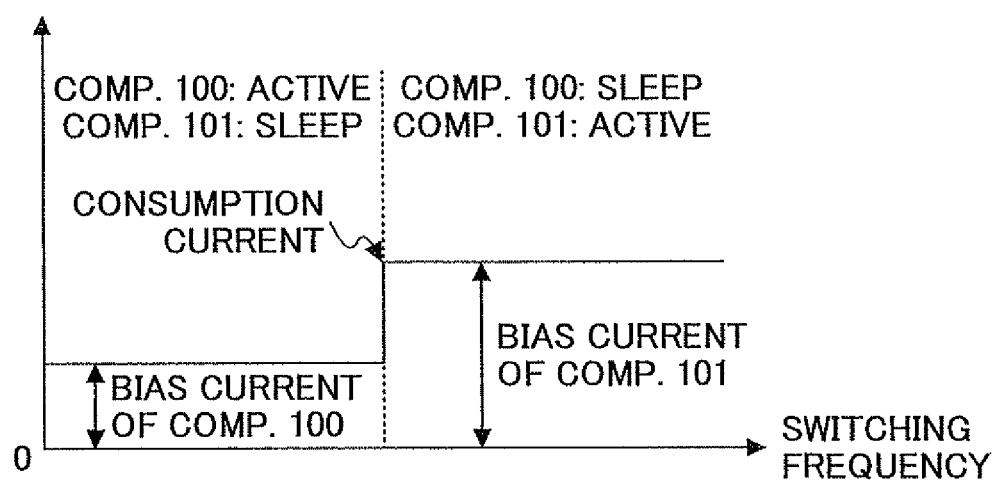
FIG. 10 is a diagram showing a relationship between the switching frequency of the switching supply and a consumption current of the set signal generation circuit for the first switching device in the third embodiment of the present invention.

FIG. 10 is a diagram showing a relationship between the switching frequency of the switching supply and a consumption current of the set signal generation circuit 12a for the first switching device M1. Until a predetermined switching frequency is reached, the comparator 100 of which bias current is lower than the other becomes active, and the comparator 101 enters the sleep mode. Then, the selection circuit 102 selects the output of the comparator 100. As a result, the consumption current of the set signal generation circuit 12a is kept constant at a low value. After the switching frequency passes the predetermined switching frequency, the comparator 101 of which bias current is higher than the other becomes active, and the comparator 100 enters the sleep mode. Then, the selection circuit 102 selects the output of the comparator 101. As a result, the consumption current of the set signal generation circuit 12a is set to be kept constant at a high value.

In the third embodiment, when the switching frequency is low, the comparator 100 of which bias current is lower than the other becomes active, and the consumption current of the set signal generation circuit 12a becomes low. Thus, a consumption current of a DC-DC converter control circuit 31a becomes low, which makes it possible to improve the efficiency of the DC-DC converter 31 including the DC-DC converter control circuit 31a.

Furthermore, if the switching frequency is high, the comparator 100 whose bias current is higher than the other becomes active. Then, because a characteristic in accordance with the switching frequency is provided for the comparator 100, stabilizing the output voltage Vout of the switching supply is possible.

In the third embodiment, in general, it is thought that a comparator with a low consumption current has an inferior characteristic, and a comparator with a higher consumption current has a superior characteristic. If the output current is low and the switching frequency is low, because the comparator constituting the set signal generation circuit 12a for the switching device M1 does not need a superior characteristic, the comparator 100 with an inferior characteristic and a low consumption current is selected. Thus, the consumption current of the DC-DC converter control circuit 31a becomes low, which can improve efficiency of the DC-DC converter 31 including the DC-DC converter control circuit 31a.

In addition, if the output current is high and the switching frequency is high, because the comparator constituting the set signal generation circuit 12a for the first switching device M1 needs a superior characteristic, the comparator 101 with a superior characteristic and a high consumption current is selected. Thus, because the characteristic according to the switching frequency is provided for the comparator 101 constituting the set signal generation circuit 12a for the first switching device M1, stabilizing the Vout of the switching supply is possible.

Fourth Embodiment

Figure 11:
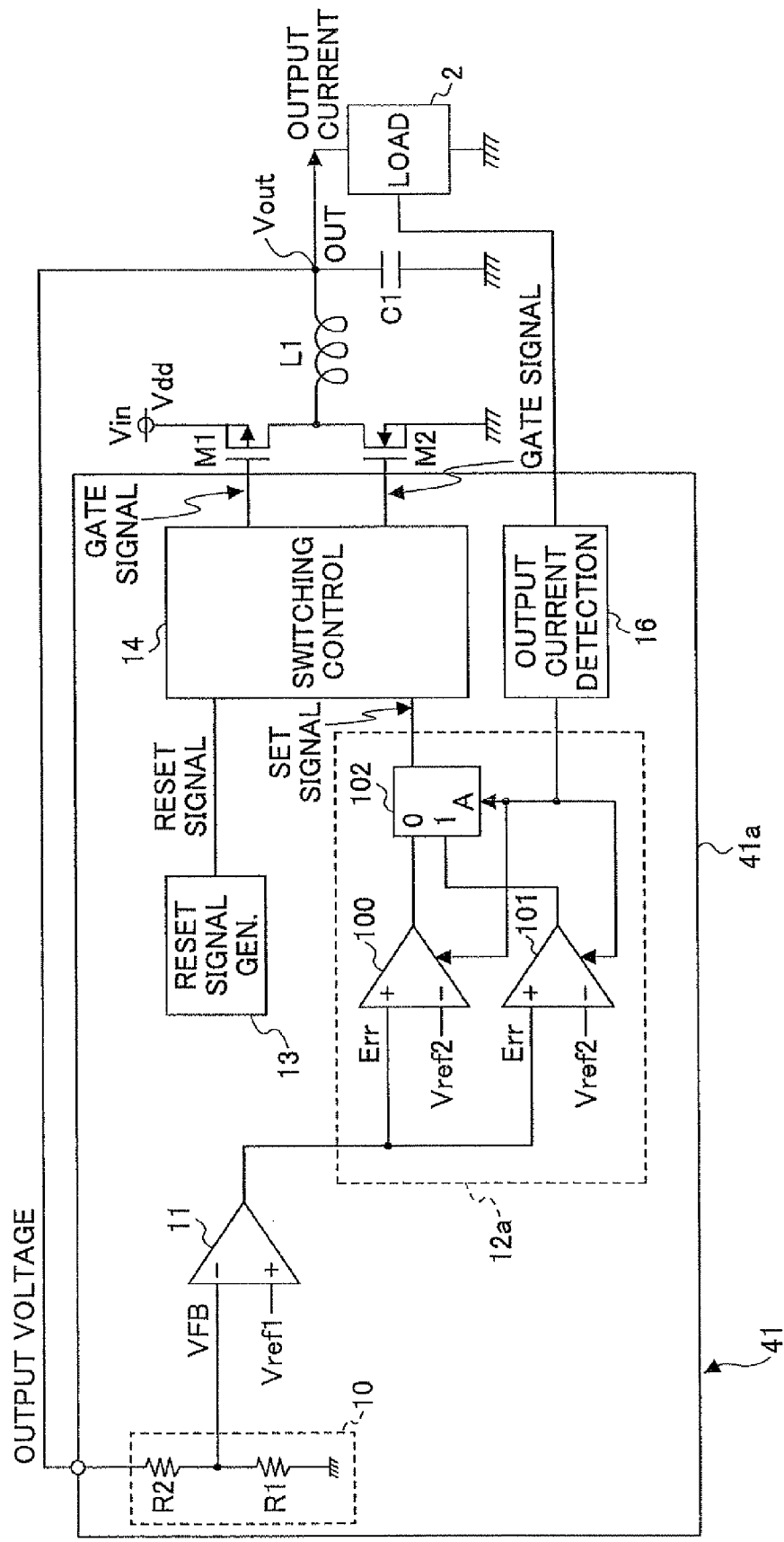
FIG. 11 is a configuration diagram of a DC-DC converter capable of selecting a comparator among two or more comparators constituting a set signal generation circuit for a first switching device in a fourth embodiment of the present invention.

FIG. 11 is a configuration diagram of a DC-DC converter control circuit 41a in a fourth embodiment that makes it possible to select a comparator among two or more comparators 100, 101 constituting a set signal generation circuit 12a for a first switching device M1, according to an output current of a switching supply. The fourth embodiment includes an output current detection circuit 16 instead of the switching frequency detection circuit 15 in the third embodiment shown in FIG. 9. Since operation of the switching supply and the other configurations are the same as the first embodiment, the same and corresponding parts in drawings are expressed with the same reference numerals, and explanations of the parts are not repeated to avoid overlap of the explanations.

As mentioned above, in case of VFM mode control method, it is possible to indirectly detect a switching frequency by detecting an output current of the switching supply. Therefore, in the fourth embodiment, the switching frequency is detected by detecting the output current by the output current detection circuit 16, and a selection circuit 102 selects one of two comparators 100, 101.

When the output current is low, the comparator 100 is set to be active and the comparator 101 is set to enter sleep mode. When the output current is high, the comparator 100 is set to enter the sleep mode and the comparator 101 is set to be active. Then, receiving the signal generated by the output current detection circuit 16, the selection circuit 102 makes an output from the active comparator effective.

Figure 12:
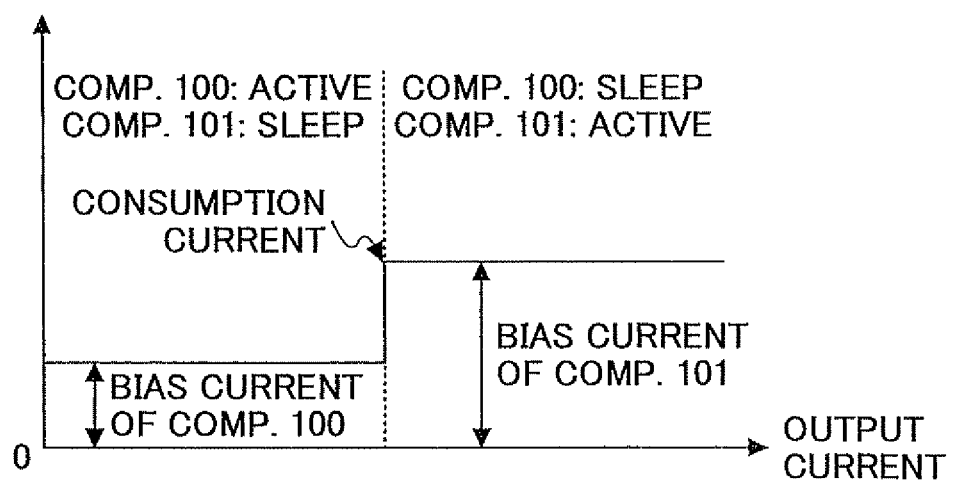
FIG. 12 is a diagram showing a relationship between an output current of a switching supply and a consumption current of the set signal generation circuit for the first switching device in the fourth embodiment of the present invention.

FIG. 12 is a diagram showing a relationship between an output current of the switching supply and a consumption current of a set signal generation circuit 12a for a switching device M1. Until a predetermined output current value is reached, the comparator 100 of which bias current is lower than the other becomes active, and the comparator 101 enters the sleep mode. Then, the selection circuit 102 selects an output of the comparator 100. As a result, a consumption current of the set signal generation circuit 12a is kept constant at a low value. After the output current passes the predetermined output current value, the comparator 101 of which bias current is higher than the other becomes active and the comparator 100 enters the sleep mode. Then, the selection circuit 102 selects an output of the comparator 101. As a result, a consumption current of the set signal generation circuit 12a is set to be kept constant at a high value.

In the fourth embodiment, if the output current is low, the comparator 100 of which bias current is lower than the other becomes active, and the consumption current becomes low. Thus, the consumption current of the DC-DC converter control circuit 41a becomes low, which can improve efficiency of the DC-DC converter 31 including the DC-DC converter control circuit 41a.

Moreover, if the output current is high, the comparator 101 of which bias current is higher than the other becomes active. Then, because a characteristic according to the switching frequency is provided for the comparator 100, it is possible to stabilize an output voltage Vout of the switching supply.

In the fourth embodiment, in general, it is thought that a comparator of which consumption current is low has an inferior characteristic and a comparator of which consumption current is high has a superior characteristic. If the output current is low and the switching frequency is low, because the comparator constituting the set signal generation circuit 12a for the switching device M1 does not need a superior characteristic, the comparator 100 with an inferior characteristic and a low consumption current is selected. This makes the consumption current of the DC-DC converter control circuit 12a lower, which can improve efficiency of the DC-DC converter 41 including the DC-DC converter control circuit 41a.

In addition, if the output current is high and the switching frequency is high, because the comparator constituting the set signal generation circuit 12a for the first switching device M1 needs a better characteristic, the comparator 101 with a better characteristic and a higher consumption current is selected. Thus, because the characteristic according to the switching frequency is provided for the comparator 101 constituting the set signal generation circuit 21a for the first switching device M1, it is possible to stabilize an output voltage Vout of the switching supply.

Fifth Embodiment

Figure 13:
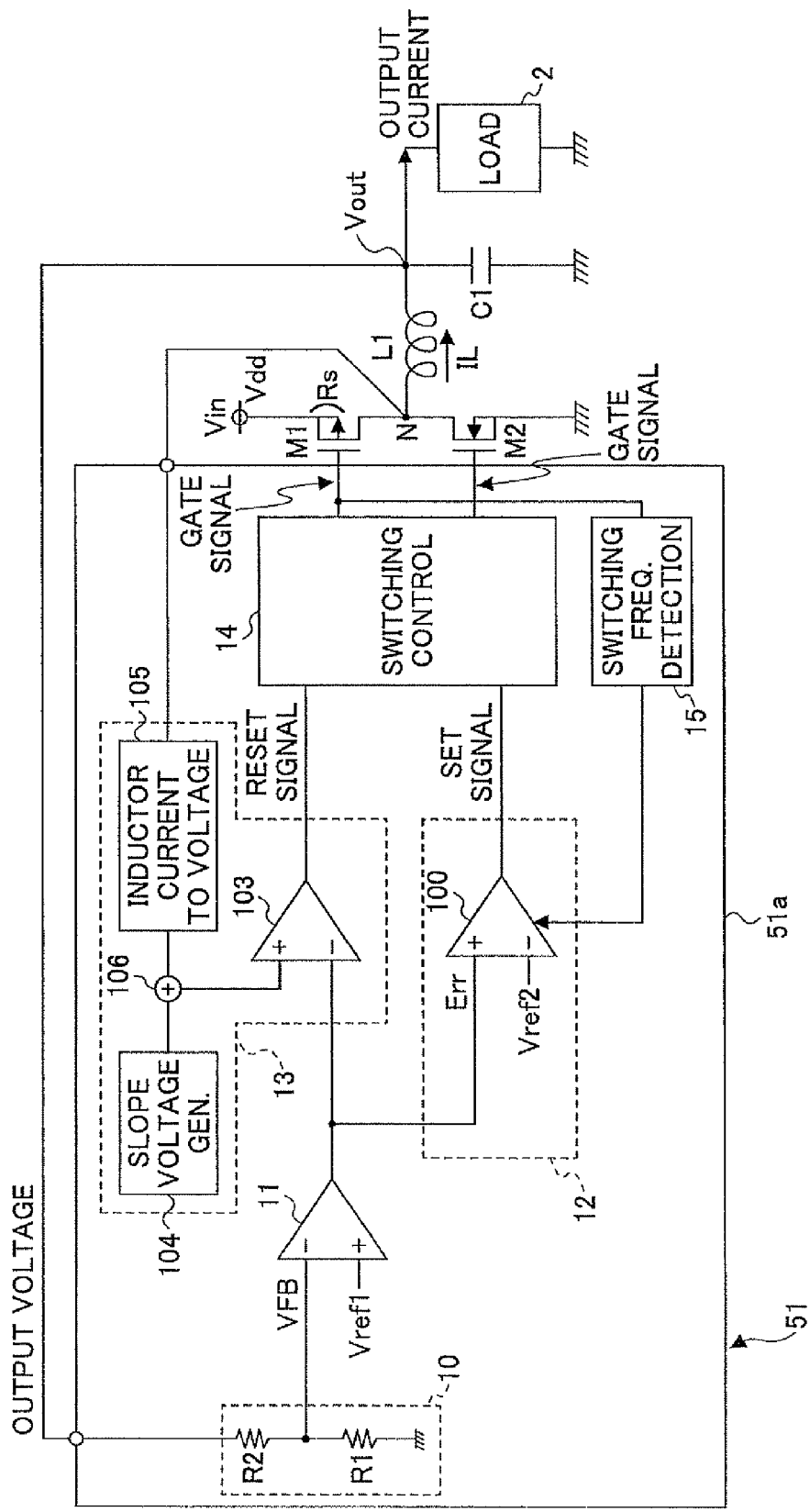
FIG. 13 is a configuration diagram of a DC-DC converter showing a detailed configuration of a reset signal generation circuit for a first switching device in a fifth embodiment of the present invention.

FIG. 13 is a diagram of DC-DC converter 51 showing a detailed configuration of a reset signal generation circuit 13 for a switching device M1. A fifth embodiment shown in FIG. 13 illustrates a detailed configuration of the reset signal generation circuit 13 for the switching device M1 in the first embodiment shown in FIG. 2.

As shown in FIG. 13, the reset signal generation circuit 13 for the first switching device M1 includes an inductor-current-to-voltage-conversion circuit 105 that returns an inductor current and generates an inductor-current-conversion voltage, a slope voltage generation circuit 104 that generates a primary slope voltage that increases from a time point when the first switching device is turned on, a voltage operation circuit 106 that adds the slope voltage to the inductor-current-conversion voltage and a third comparator 103.

Figure 14:
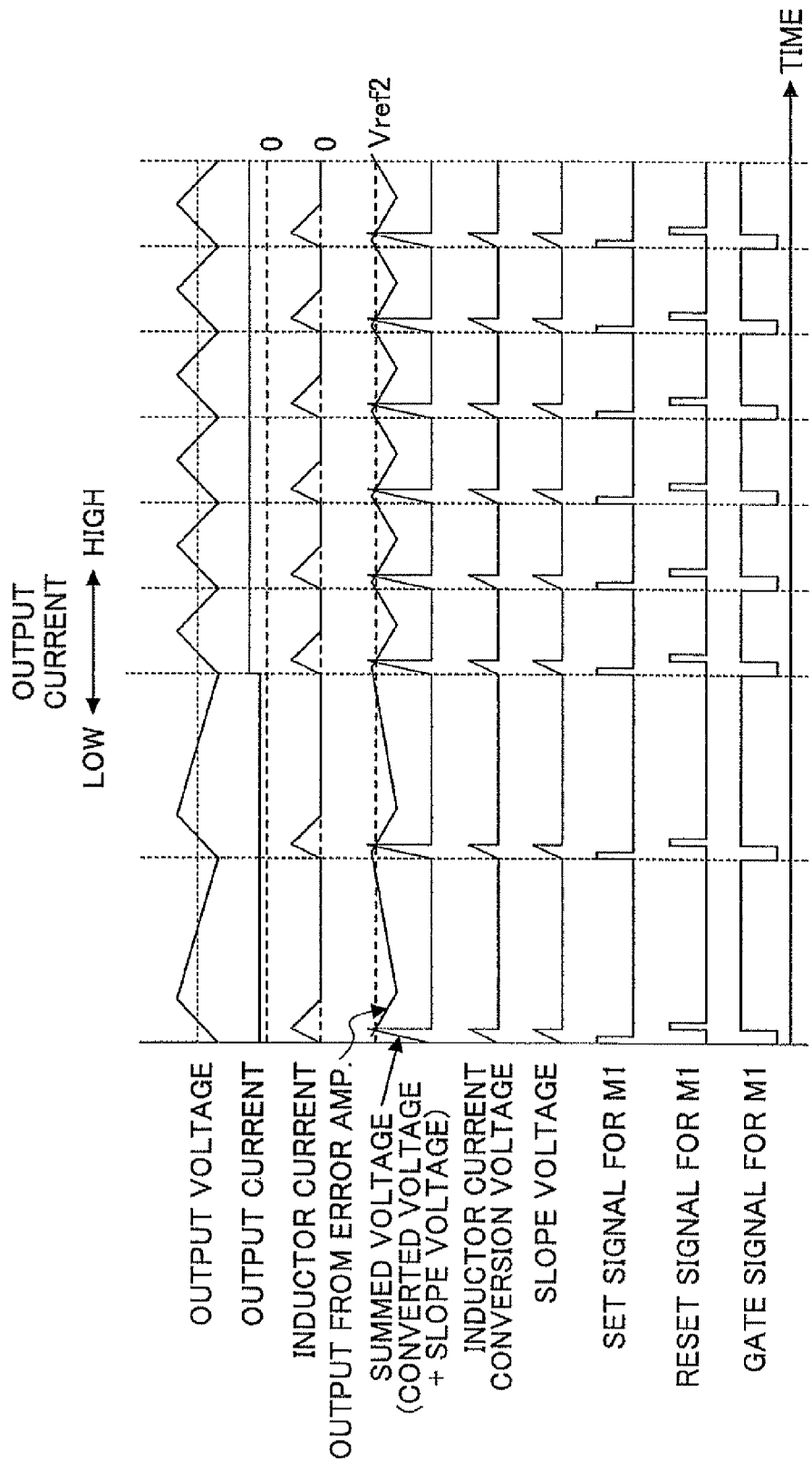
FIG. 14 is a waveform chart showing operation of a switching supply including that of a DC-DC converter control circuit in the fifth embodiment of the present invention.

FIG. 14 is a waveform chart showing an operation of a switching supply of the DC-DC converter 51 shown in FIG. 13. The operation of the switching supply in the fifth embodiment is explained below.

When an output Err of an error amplifier 11 reaches a second reference voltage Vref2, a set signal for the first switching device M1, an output from a first comparator 100, turns from "Lo" to "Hi", and the first switching device M1 is turned on. While the first switching device M1 is in an on-state, a current flowing into an inductor L increases. The inductor-current-to-voltage-conversion circuit 105 is a circuit that converts an inductor current into a voltage at a certain rate. When an input voltage is expressed as Vin, and the inductor current is expressed as IL, and an on-resistance of the first switching device M1 is expressed as Rs, a voltage of a connection point N of the first switching device M1 and a second switching device M2 while the first switching device M1 is in an on-state, is expressed as Vin−IL×Rs. The inductor-current-to-voltage-conversion circuit 105 makes the voltage of the connection point N the input and converts the inductor current IL into the inductor-current-conversion-voltage.

The slope voltage generation circuit 104 generates the primary slope voltage from the time point when the first switching device M1 is turned on. When the voltage obtained by adding the slope voltage to the inductor-current-conversion voltage reaches the output value Err of the error amplifier 11, a reset signal for the first switching device M1, an output from the third comparator 103, turns from "Lo" to "Hi".

When the reset signal turns from "Lo" to "Hi", the first switching device M1 is reset (i.e., turned off).

Regarding the inductor-current-conversion voltage, the inductor current IL need not be converted into the voltage at a time point when the first switching device M1 is turned off. It is preferable for the inductor-current-conversion voltage to be controlled by a conversion starting voltage as shown in FIG. 14. Moreover, the slope voltage also does not need to increase at a time point when the first switching device M1 is turned off, and is preferably controlled by an increase starting voltage as shown in FIG. 14.

In the above discussed embodiment, a configuration adding the slope voltage to the inductor-current-conversion voltage is explained, a configuration obtaining a difference between the inductor-current-conversion voltage and the slope voltage is also possible.

Moreover, the slope voltage generation circuit 104 may generate a slope voltage more than first order.

In addition, the fifth embodiment shows the detailed configuration of the reset signal generation circuit 13 for the first switching device M1 in the first embodiment, but configuring the reset signal generation circuit 13 in the second, third, fourth embodiment as shown in the FIG. 13 is also possible.

Thus, according to the embodiments of the present invention, if an output current is low and a switching frequency is low, a consumption current of a DC-DC converter control circuit becomes low, which can improve efficiency of a DC-DC converter including the DC-DC converter control circuit.

In addition, if the output current is high and the switching frequency is high, because a characteristic according to the switching frequency is provided for a first comparator, it is possible to stabilize an output voltage of a switching supply.

The present invention is not limited to the specifically disclosed embodiments, and variations and modifications may be made without departing from the scope of the present invention.

The present application is based on Japanese Priority Patent Application No. 2008-254999, filed on Sep. 30, 2008, the entire contents of which are incorporated herein by reference.

The invention claimed is:

1. A DC-DC converter to convert an input voltage input from an input terminal into a predetermined voltage and to output the predetermined voltage through an output terminal, the DC-DC converter comprising:
    a first switching device to provide energy for an inductor;
    a second switching device or a rectifying device to discharge the energy from the inductor to the output terminal;
    an error amplifier to amplify an error voltage between a first reference voltage and a monitoring voltage obtained by dividing an output voltage output from the output terminal;
    a set signal generation circuit for the first switching device, including a first comparator into which a second reference voltage and an output of the error amplifier are input;
    a reset signal generation circuit for the first switching device;
    a control circuit for the first switching device and one of the second switching device and the rectifying device into which an output from the set signal generation circuit for the first switching device and an output from the reset signal generation circuit for the first switching device are input; and
    a detection circuit to detect a switching frequency of an electric power supply and to output an output signal, corresponding to the detected switching frequency, to the first comparator, to control a characteristic of the first comparator, based on the detected switching frequency.

2. The DC-DC converter as claimed in claim 1, wherein the characteristic of the first comparator is changed by changing a consumption current of the first comparator.

3. The DC-DC converter as claimed in claim 2, wherein the consumption current of the first comparator has a linear relationship with the switching frequency.

4. The DC-DC converter as claimed in claim 2, wherein the consumption current of the first comparator is changed at a preliminarily set switching frequency.

5. The DC-DC converter as claimed in claim 1,
    wherein the reset signal generation circuit for the first switching device includes a comparator, and
    wherein inputs of the comparator, which compares, include
        (a) one of (i) a voltage obtained by adding a slope voltage increasing from a time point when the first switching device is turned on to a voltage generated by returning an inductor current at a certain rate, and (ii) a voltage obtained by calculating a difference between the voltage generated by returning the inductor current and a slope voltage decreasing from the time point when the first switching device is turned on at the certain rate, and
        (b) the output from the error amplifier.

6. A DC-DC converter to convert an input voltage input from an input terminal into a predetermined voltage and to output the predetermined voltage through an output terminal, the DC-DC converter comprising:
    a first switching device to provide energy for an inductor;
    a second switching device or a rectifying device to discharge the energy from the inductor to the output terminal;
    an error amplifier to amplify an error voltage between a first reference voltage and a monitoring voltage obtained by dividing an output voltage output from the output terminal;
    a set signal generation circuit for the first switching device, including two or more comparators with different characteristics into which a second reference voltage and an output of the error amplifier are input;
    a reset signal generation circuit for the first switching device;
    a control circuit for the first switching device and one of the second switching device and the rectifying device into which an output from the set signal generation circuit for the first switching device and an output from the reset signal generation circuit for the first switching device are input; and
    a detection circuit to detect a switching frequency and to output an output signal, based the detected switching frequency, to select one of the comparators that have different characteristics.

* * * * *